United States Patent
He et al.

(10) Patent No.: US 11,611,167 B2
(45) Date of Patent: Mar. 21, 2023

(54) PLUG CONNECTOR AND CONNECTOR ASSEMBLY

(71) Applicant: DONGGUAN LUXSHARE TECHNOLOGIES CO., LTD, Dongguan (CN)

(72) Inventors: Yunfeng He, Dongguan (CN); Hongji Chen, Dongguan (CN); Haohan Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 203 days.

(21) Appl. No.: 17/143,722

(22) Filed: Jan. 7, 2021

(65) Prior Publication Data

US 2021/0218176 A1    Jul. 15, 2021

(30) Foreign Application Priority Data

Jan. 15, 2020   (CN) .......................... 202010044791.3

(51) Int. Cl.
*H01R 13/26*    (2006.01)
*H01R 13/10*    (2006.01)
(Continued)

(52) U.S. Cl.
CPC ............. *H01R 13/26* (2013.01); *H01R 13/10* (2013.01); *H01R 13/506* (2013.01);
(Continued)

(58) Field of Classification Search
CPC ...... H01R 13/26; H01R 13/10; H01R 13/502; H01R 13/506; H01R 13/6272; H01R 4/48; H01R 13/641; G02B 6/0001
See application file for complete search history.

(56) References Cited

U.S. PATENT DOCUMENTS 4,089,579 A * 5/1978 Steinbach .......... H01R 13/6273
                                                 439/353
4,113,179 A * 9/1978 McKee .............. H01R 13/6275
                                                 439/354
(Continued)

FOREIGN PATENT DOCUMENTS

CN           2681377 Y       2/2005
CN         201142392 Y      10/2008
(Continued)

*Primary Examiner* — Tho D Ta
(74) *Attorney, Agent, or Firm* — Birch, Stewart, Kolasch & Birch, LLP

(57) ABSTRACT

The present disclosure discloses a plug connector including an insulating housing, a number of plug terminals and a cable. The insulating housing includes a width direction extending along a left-and-right direction. The plug terminals are retained by the insulating housing and arranged in two rows in the width direction of the insulative housing. The plug terminals of each row are arranged in an upper-and-lower direction and spaced away from each other in the upper-and-lower direction. Each plug terminal extends along a front-and-back direction. The cable includes a number of core wires correspondingly and electrically connected with the plug terminals. A connector assembly including the plug connector and the mated socket connector is also disclosed in the present disclosure.

16 Claims, 16 Drawing Sheets

(51) Int. Cl.
*H01R 13/506* (2006.01)
*H01R 13/627* (2006.01)
*F21V 8/00* (2006.01)
*H01R 4/48* (2006.01)
*H01R 13/641* (2006.01)
*H01R 13/717* (2006.01)

(52) U.S. Cl.
CPC ....... *H01R 13/6272* (2013.01); *G02B 6/0001* (2013.01); *H01R 4/48* (2013.01); *H01R 13/641* (2013.01); *H01R 13/7175* (2013.01)

(56) References Cited

U.S. PATENT DOCUMENTS

| | | | | |
|---|---|---|---|---|
| 5,234,358 | A | * | 8/1993 | Polgar ................. H01R 13/506 439/906 |
| 5,380,225 | A | * | 1/1995 | Inaoka ................. H01R 12/716 439/284 |
| 5,409,400 | A | * | 4/1995 | Davis .................... H01R 24/60 439/906 |
| 5,626,483 | A | * | 5/1997 | Naitoh ................. H01R 13/035 428/209 |
| 6,471,539 | B1 | * | 10/2002 | Yu ........................ H01R 13/641 439/74 |
| 7,618,262 | B2 | | 11/2009 | Fogg et al. |
| 7,651,361 | B2 | | 1/2010 | Henry et al. |
| 7,727,025 | B2 | | 6/2010 | Fogg et al. |
| 7,785,140 | B2 | | 8/2010 | Henry |
| 10,122,134 | B2 | * | 11/2018 | Shibuya ................. H01R 24/84 |

FOREIGN PATENT DOCUMENTS

| | | |
|---|---|---|
| CN | 101572363 A | 11/2009 |
| CN | 101710661 A | 5/2010 |
| CN | 204376023 U | 6/2015 |
| CN | 206135027 U | 4/2017 |
| CN | 207124334 U | 3/2018 |
| CN | 208570992 U | 3/2019 |
| CN | 109904633 A | 6/2019 |
| JP | 10-125381 A | 5/1998 |

* cited by examiner

PLUG CONNECTOR AND CONNECTOR ASSEMBLY

CROSS-REFERENCE TO RELATED APPLICATIONS

This patent application claims a priority of a Chinese Patent Application No. 202010044791.3, filed on Jan. 15, 2020 and titled "PLUG CONNECTOR", the entire content of which is incorporated herein by reference.

TECHNICAL FIELD

The present disclosure relates to a plug connector and a connector assembly, which have reduced sizes in their width directions.

BACKGROUND

An RJ45 connector is a universal telecommunications interface that is widely used in computer networks. The existing RJ45 connector generally has eight terminals in total, and the eight terminals are distributed in a straight row along a left-and-right direction inducing that the width of the RJ45 connector is large. An RJ11 connector is a universal telecommunications interface that is widely used in telephone lines. The existing RJ11 connector generally has four or six terminals in total, which is less than that of RJ45 connector. The four or six terminals of RJ11 connector are also distributed in a straight row along a left-and-right direction, which induces that the width of the RJ11 connector is large, too. Multiple interfaces are required to be distributed in the left-and-right direction of the electronic appliance according to multifunctional needs of customers. The existing RJ-typed connectors cannot meet the market demand for high-density installation.

SUMMARY

An object of the present disclosure is to provide a plug connector which saves space in its width direction, and also provide a connector assembly comprising the plug connector of the present disclosure and a mated socket connector.

In order to achieve the above object, the present disclosure discloses a plug connector comprising an insulating housing, a plurality of plug terminals and a cable. The insulating housing has a width extending along a left-and-right direction. The plug terminals are retained by the insulating housing and arranged in two rows in the width direction of the insulative housing. The plug terminals of each row are arranged in an upper-and-lower direction and spaced away from each other in the upper-and-lower direction. Each plug terminal extends along a front-and-back direction. The cable comprises a plurality of core wires correspondingly and electrically connected with the plug terminals.

In order to achieve the above object, the present disclosure further discloses a connector assembly comprising a plug connector and a socket connector. The plug connector comprises an insulating housing with a width extending along a left-and-right direction, a plurality of plug terminals retained by the insulating housing and a cable. The plug terminals are arranged in two rows in the left-and-right direction. The plug terminals of each row are separately arranged in an upper-and-lower direction. Each plug terminal extends along a front-and-back direction. The cable comprises a plurality of core wires correspondingly and electrically connected with the plug terminals. The socket connector comprises an inner plastic block, an outer plastic frame surrounding the inner plastic block and a plurality of socket terminals retained by the inner plastic block. The socket terminals are also arranged in two rows in the left-and-right direction. The plug terminals respectively and electrically connect with the socket terminals. The socket terminals of each row are separately arranged in the upper-and-lower direction. Each socket terminal extends along the front-and-back direction, too.

Compared with the prior art, the plug terminals of the plug connector of the present disclosure are fixed on the left and right side walls of the insulating housing and symmetrically distributed in two rows in the width direction, thereby saving space of the plug connector in the width direction, and so does the connector assembly which comprises the plug connector and the mated socket connector.

DETAILED DESCRIPTION

Figure 1:
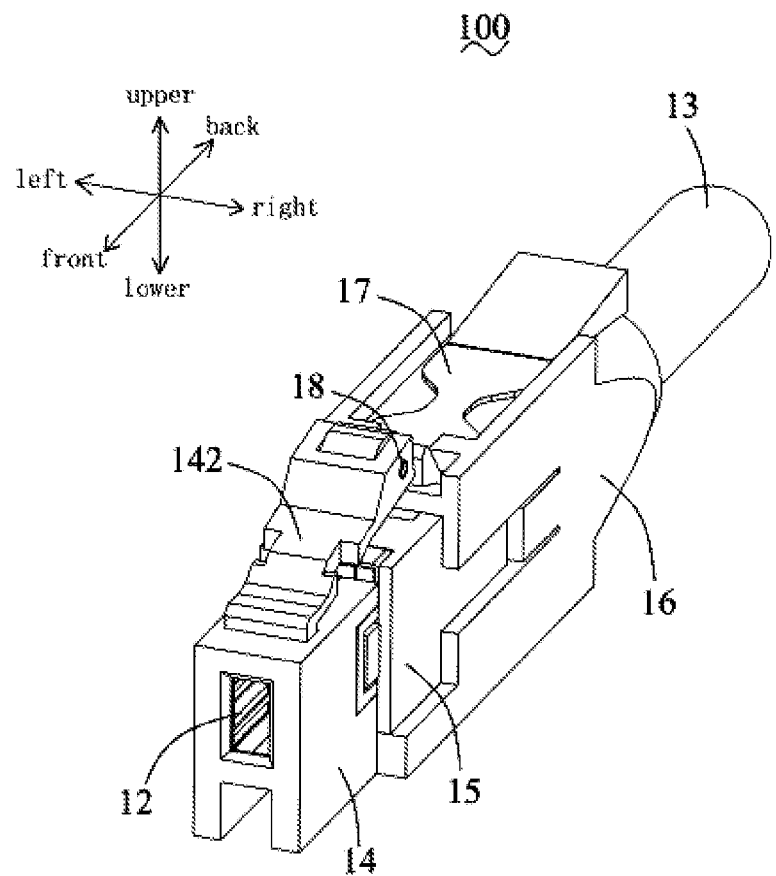
FIG. 1 is a perspective, assembled view of a plug connector in accordance with a first embodiment of the present disclosure.
Figure 2:
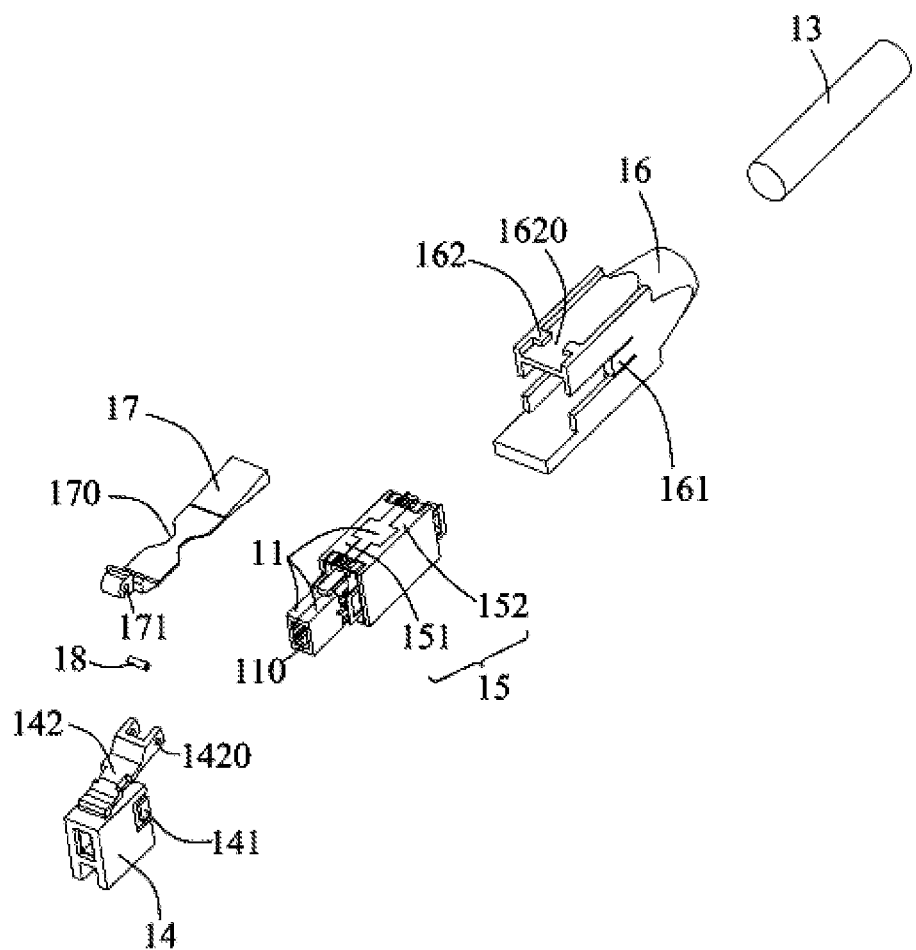
FIG. 2 is a perspective, exploded view of the plug connector.
Figure 3:
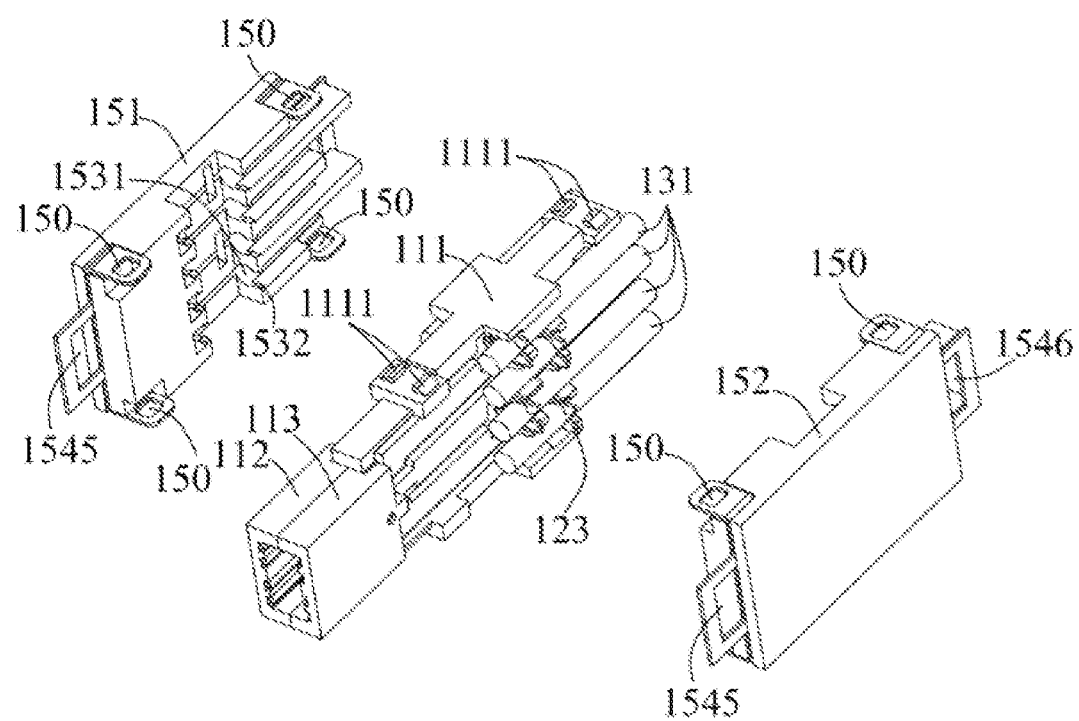
FIG. 3 is a perspective, partly exploded view of the plug connector.
Figure 4:
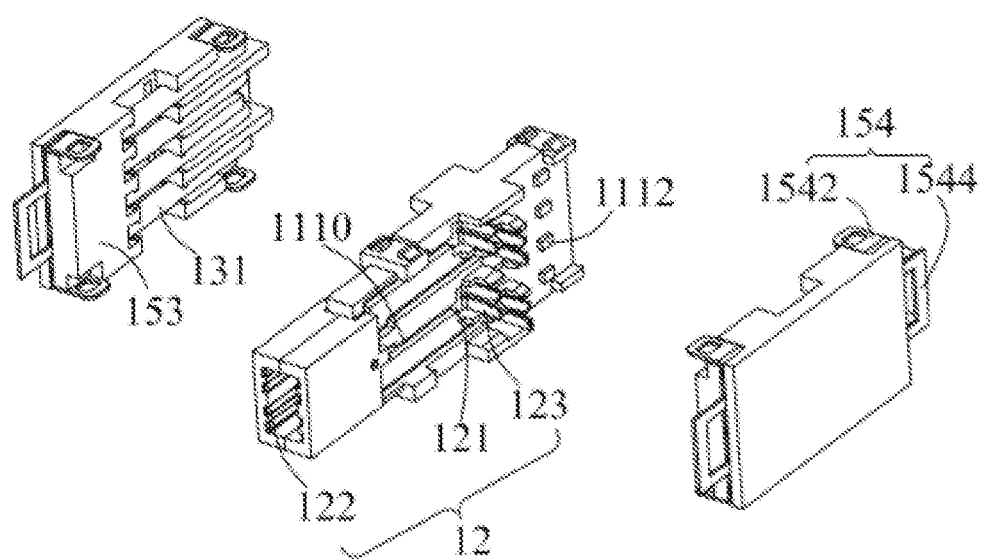
FIG. 4 is similar to FIG. 3 but taken a view from another angle.
Figure 5:
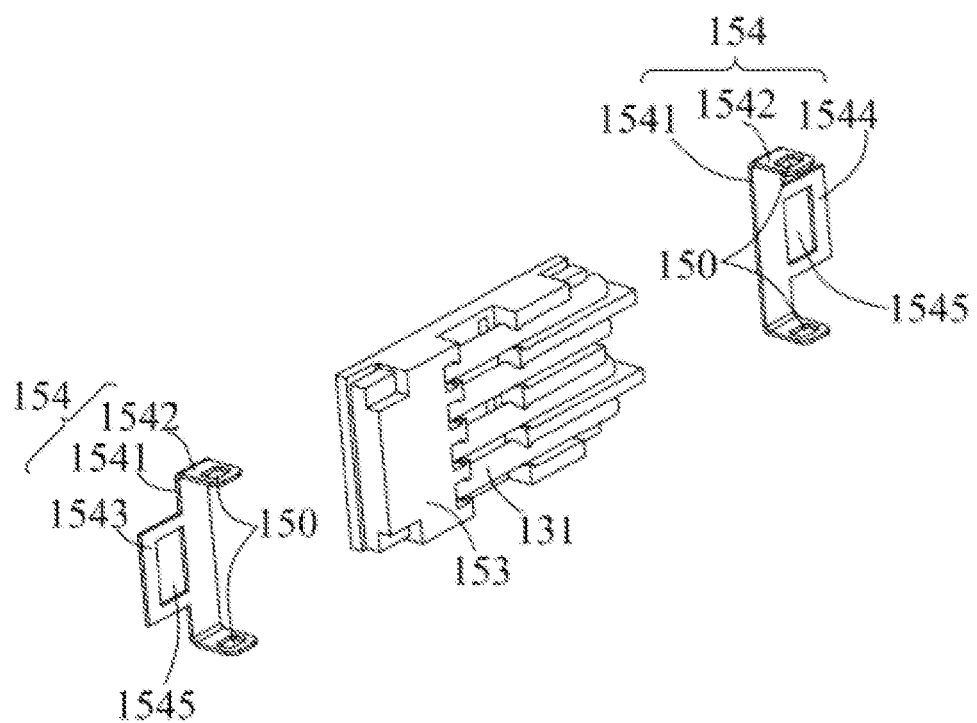
FIG. 5 is an exploded view of the securing assembly in FIG. 4.
Figure 6:
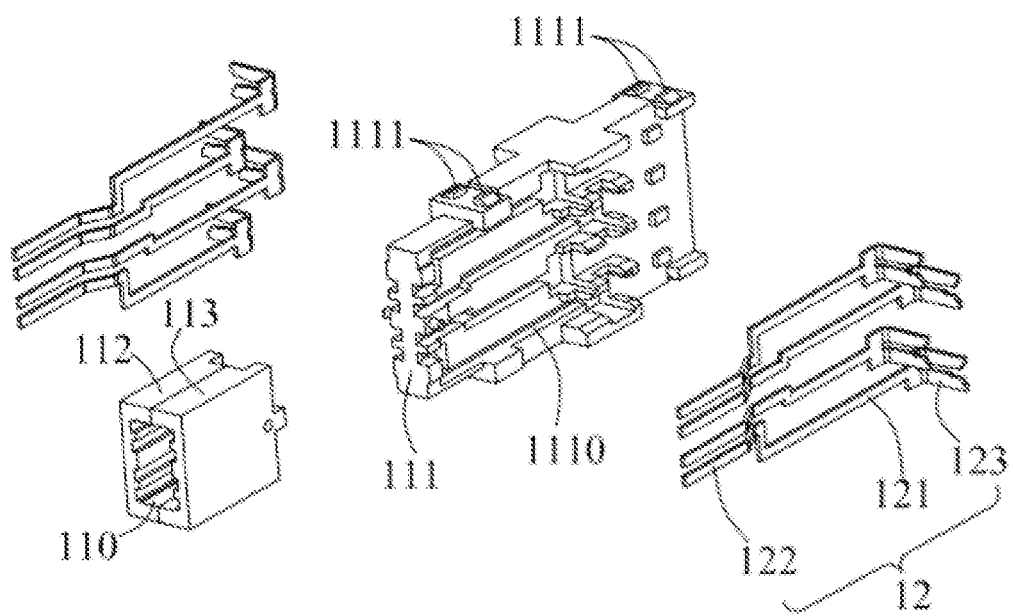
FIG. 6 is an exploded view of the insulating housing and the plug terminals in FIG. 4.
Figure 7:
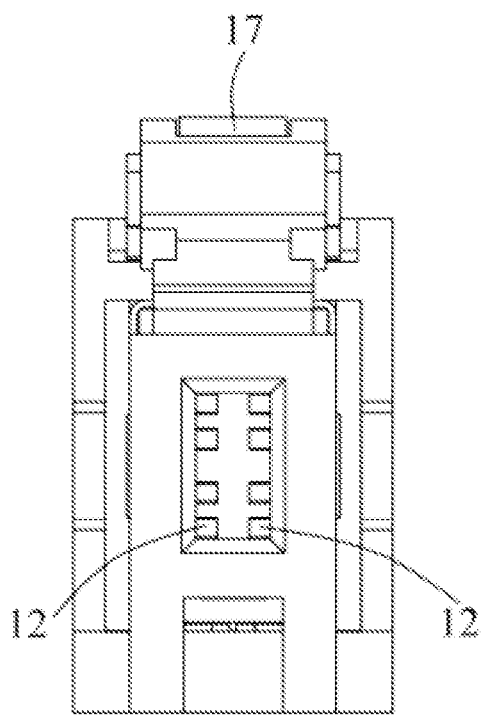
FIG. 7 is a front view of FIG. 1.
Figure 8:
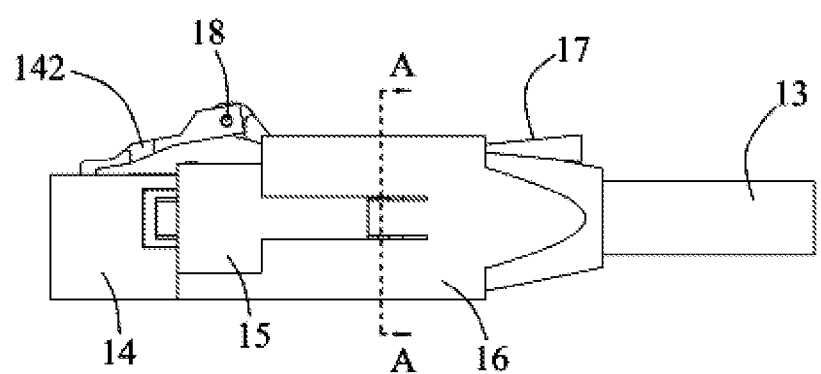
FIG. 8 is a right side view of FIG. 1.
Figure 9:
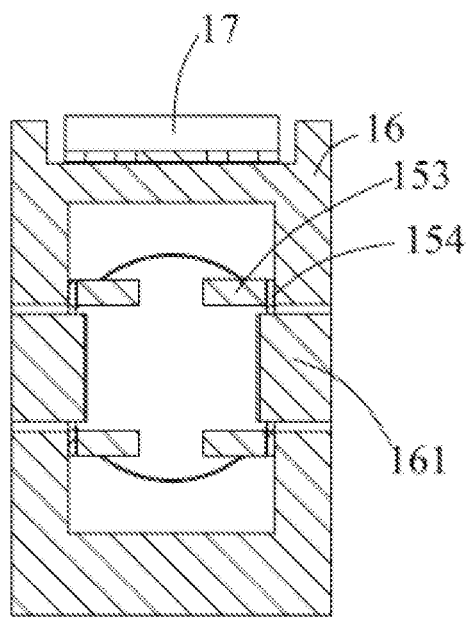
FIG. 9 is a cross-sectional view when taken along line A-A in FIG. 8.

Referring to FIGS. 1 to 16, a connector assembly of the present disclosure includes a plug connector 100 and a socket connector 200 mated with the plug connector 100. The plug connector 100 of the present disclosure is preferably an RJ-typed plug connector and the socket connector 200 of the present disclosure is preferably an RJ-typed socket connector. However, it is not limited, that is, the present disclosure is applicable to other types of mated plug connector and socket connector.

Referring to FIGS. 1 to 13, the plug connector 100 of the present disclosure includes an insulating housing 11, a plurality of plug terminals 12, and a cable 13 with a plurality of core wires 131. The plug terminals 12 are retained in the insulating housing 11. The core wires 131 are correspondingly and electrically connected with the plug terminals 12.

The insulating housing 11 includes a first insulating body 111, a second insulating body 112, and a third insulating body 113. The first insulating body 111 extends along both an up-and-down direction and a front-and-back direction. A plurality of passages 1110 extending along the front-and-back direction are symmetrically distributed on the left and right surfaces of the first insulating body 111. The second insulating body 112 and the third insulating body 113 are both mounted on the front end of the first insulating body 111. The second insulating body 112 and the third insulating body 113 are respectively and correspondingly positioned at two opposite sides of the first insulating body 111. The second insulating body 112 and the third insulating body 113 are regarded as two side walls of the insulating housing 11 in a left-and-right direction. The left-and-right direction is generally regarded as the width direction when taken a front view by facing to the insertion port. A receiving space 110 is formed between the second insulating body 112 and the third insulating body 113. Each plug terminal 12 includes a retaining arm 121 fixed in the passage 1110, a contacting arm 122 extending forward from the front end of the retaining arm 121 into the receiving space 110, and a tail portion 123 laterally bending from the rear end of the retaining arm 121 for connecting with the core wire 131. The plug terminals 12 are positioned in two vertical rows in the width direction of the insulative housing, specifically and symmetrically on the inner surfaces of the two side walls of the insulating housing 11. The plug terminals 12 of each row are arranged in the upper-and-lower direction and spaced away from each other in the upper-and-lower direction. The plug terminals 12 on each side wall include at least one pair of differential signal terminals, and in the preferred embodiment of the present disclosure, there are two pairs of differential signal terminals retained on each side wall. Each plug terminal 12 extends along the front-and-back direction.

The plug connector 100 includes a securing assembly 15 enclosing the first insulating body 111, the plug terminals 12 and the core wires 131. The second insulating body 112 and the third insulating body 113 are exposed outside of the securing assembly 15. The securing assembly 15 includes a left plate 151 beside the left surface of the first insulating body 111 and a right plate 152 beside the right surface of the first insulating body 111. The left plate 151 and the right plate 152 are separated from each other and both attached to the first insulating body 111. The first insulating body 111 includes a first securing portion. Each of the left plate 151 and the right plate 152 includes a second securing portion corresponding to the first securing portion. One of the first securing portion and the second securing portion is a protrusion 1111 and the other one of the first securing portion and the second securing portion is a receiving hole 150. In a preferred embodiment, the first insulating body 111 is symmetrically provided with at least four protrusions 1111 and each of the left and right plates 151, 152 includes at least four receiving holes 150 corresponding to the protrusions 1111. The protrusions 1111 are retained in the receiving holes 150 to make sure that both the left plate 151 and the right plate 152 can be tightly secured with the first insulating body 111 in the up-and-down direction, the left-and-right direction, and also the front-and-rear direction, without loosening. In the present embodiment of the present disclosure, there are four protrusions 1111 respectively disposed at four different positions, which are the left&front&upper, left&front&lower, left&back&upper and left&back&lower positions, of the first insulating body 111; and there are other four protrusions 1111 respectively disposed at another four different positions, which are the right&front&upper, right&front&lower, right&back&upper and right&back&lower positions, of the first insulating body 111. In other words, there are eight protrusions 1111 on the first insulating body 111 in total and the total eight protrusions 1111 are positioned in two vertical planes. The left plate 151 includes four receiving holes 150 receiving the four protrusions 1111 in the left vertical plane and the right plate 152 also includes other four receiving holes 150 receiving the other four protrusions 1111 in the right vertical plane. In general, the total eight receiving holes 150 of the left and right plates 151, 152 are respectively mounted on the different eight protrusions 1111 of the first insulating body 111. In another embodiment of the present disclosure, the protrusions 1111 can be only four in total, that is, the four receiving holes 150 of the left plate 151 and the other four receiving holes 150 of the right plate 152 are mounted to the same four protrusions 1111 of the first insulating body 111. In this condition, the total four protrusions 1111 are positioned in the only one vertical plane. In order to both fix the left plate 151 and the right plate 152, the protrusions 1111 of the second embodiment are higher than those protrusions 1111 of the first, preferred embodiment.

Referring to FIGS. 1 to 9, in the first embodiment of the present disclosure, the protrusions 1111 are non-circular protrusions and the receiving holes 150 are non-circular holes. The cooperation between the protrusions 1111 and the receiving holes 150 in the first embodiment is assembled in parallel, that is, the four receiving holes 150 of the left plate 151 are assembled on the corresponding protrusions 1111 synchronously and the other four receiving holes 150 of the right plate 152 are assembled on the corresponding protrusions 1111 synchronously, too.

Figure 10:
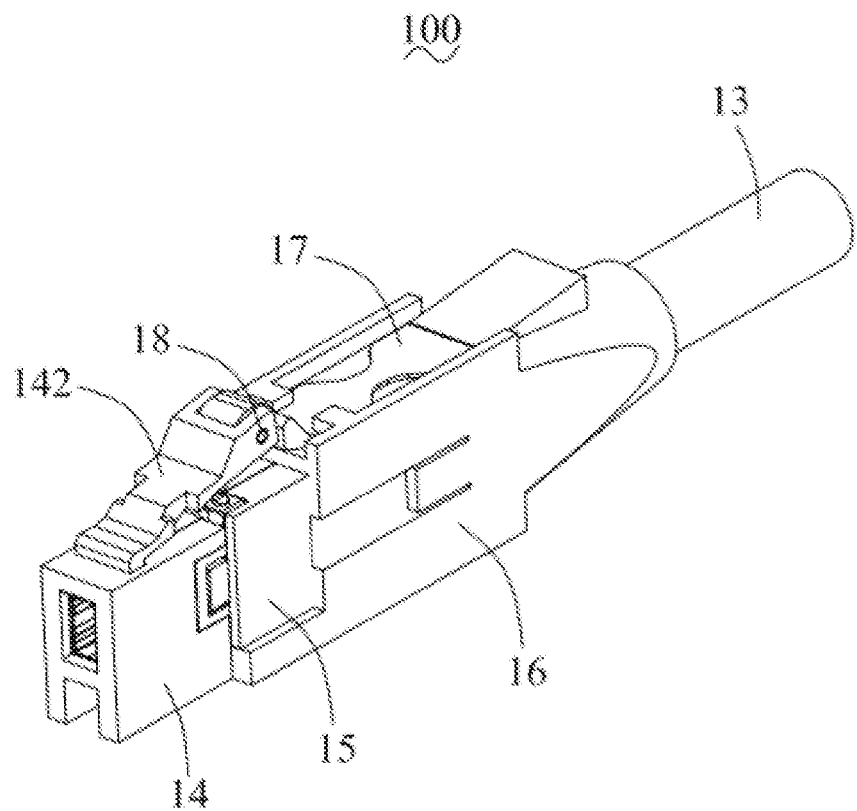
FIG. 10 is a perspective, assembled view of the plug connector in accordance with a second embodiment of the present disclosure.
Figure 11:
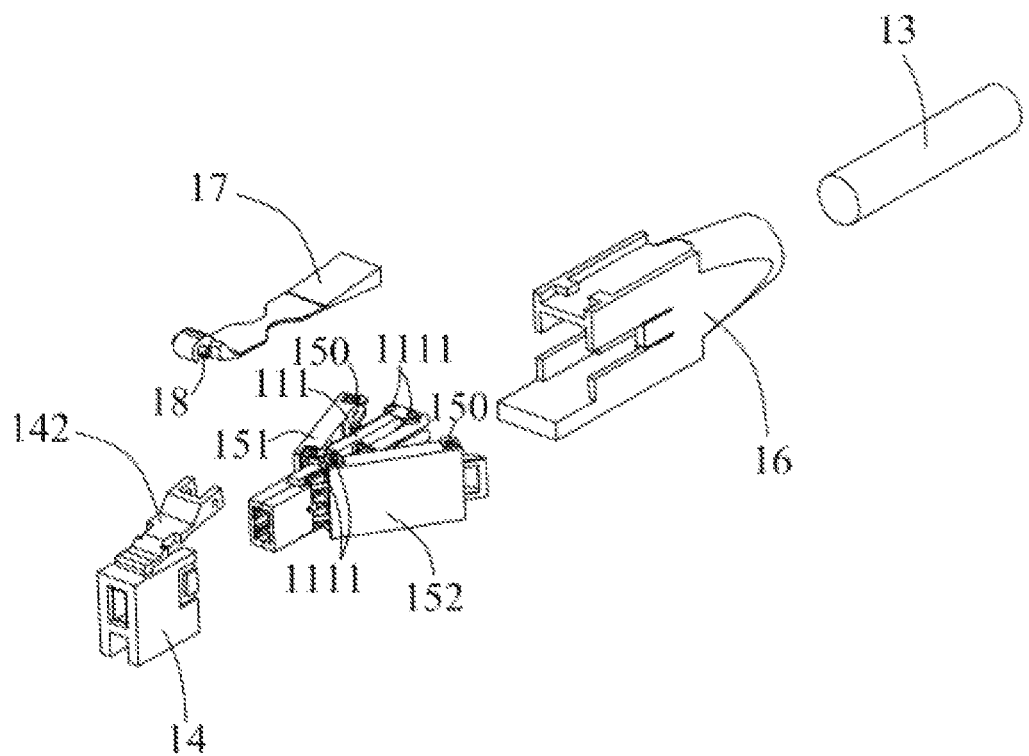
FIG. 11 is a perspective, exploded view of FIG. 10.

Referring to FIGS. 10 and 11, in the second embodiment of the present disclosure, the protrusions 1111 are cylinders and the receiving holes 150 are round holes. The left plate 151 and the right plate 152 of the second embodiment are assembled on the first insulating body 111 by rotating operation. In detail, the front two receiving holes 150 of the left plate 151 are firstly installed on the corresponding two protrusions 1111 (for example, the left&front&upper and the left&front&lower protrusions) of the first insulating body 111 as the rotating axis. The left plate 151 can be rotated around the rotating axis and finally arrives at the rear two receiving holes 150. The rear two receiving holes 150 are installed on the corresponding two protrusions 1111 (for example, the left&back&upper and the left&back&lower protrusions). Thereafter, the left plate 151 is finally fastened on the left surface of the first insulating body 111. The right plate 152 is fastened onto the right surface of the first insulating body 111 similar to the left plate 151 but assembled in a symmetrical opposite direction, and so, it is not repeatedly described here. Overall, the second insulating body 112 and the left plate 151 are located at the same left side of the first insulating body 111 while the second insulating body 112 is positioned at the front of the left plate 151, and wherein the third insulating body 113 and the right plate 152 are located at the same right side of the first insulating body 111 while the third insulating body 113 is positioned at the front of the right plate 152.

Each of the left plate 151 and the right plate 152 includes a plastic piece 153 and a metal piece 154 fixed to the plastic piece 153. The metal piece 154 includes a base portion 1541 embedded in the plastic piece 153 and a plurality of first fastening portions 1542 laterally bending from the upper and lower ends of the base portion 1541. The receiving holes 150 are located on the first fastening portions 1542 and are exposed outside of the plastic piece 153. In a preferred embodiment, the receiving holes 150 are formed on the metal piece 154; in another alternative embodiment, the receiving holes 150 can be directly formed on the plastic piece 153 without the metal piece 154.

The plastic piece 153 includes an inner side facing to the first insulating body 111 and a plurality of grooves 1531 extending along the front-and-back direction are formed on the inner side of the plastic piece 153. Each groove 1531 includes a shrink end 1532 which is formed by plastic oppositely extending along the upper-and-lower direction. The first insulating body 111 includes a plurality of lumps 1112. The lumps 1112 are located behind the passage 1110 in the front-and-back direction and symmetrically positioned on the left and right surfaces of the first insulative body 111. The lumps 1112 on the left surface of the first insulating body 111 are arranged along a straight line in the upper-and-lower direction, and so do the lumps 1112 on the right surface of the first insulating body 111. The groove 1531 correspondingly accommodates each core wire 131. The front part of each core wire 131 is fixed by the shrink end 1532, the middle part of each core wire 131 is snapped by the tail portion 123 of the plug terminal 12 and the rear part of each core wire 131 is fixed by the adjacent two lumps 1112. Therefore, the core wires 131 are sandwiched between the first insulating body 111 and the left and right plates 151, 152 and firmly received in the grooves 1531. Both the plug terminals 12 and the core wires 131 are installed to the insulating housing 11, the left plate 151 is assembled to the insulating housing 11 from the left side and the right plate 152 is assembled to the insulating housing 11 from the right side for clamping the plug terminals 12 and the core wires 131 at their right positions on the insulating housing 11.

The plug connector 100 of the present disclosure includes a butting assembly 14 wrapping outside of the second and third insulating bodies 112 and 113 and an outer shell 16 wrapping outside of the securing assembly 15. The metal piece 154 includes a second fastening portion 1543 exposed in front of the plastic piece 153 and a third fastening portion 1544 exposed behind the plastic piece 153 along the front-and-back direction. The second fastening portion 1543 includes a front fastening hole 1545 and the third fastening portion 1544 includes a rear fastening hole 1546. The butting assembly 14 includes a first locking portion 141 that is snapped into the front fastening hole 1545 and the outer shell 16 includes a second locking portion 161 that is snapped into the rear fastening hole 1546. The butting assembly 14 is fixed to both the left plate 151 and the right plate 152 via the cooperation between the first locking portion 141 and the front fastening hole 1545. The outer shell 16 is fixed to the left plate 151 and the right plate 152 via the cooperation between the second locking portion 161 and the rear fastening hole 1546.

The plug connector 100 of the present disclosure further includes a pair of pressing blocks 162, a latch 17, and a pin member 18. The pressing blocks 162 are formed on the top of the outer shell 16. The butting assembly 14 includes a flexible beam 142 extending upwardly and backwardly towards the latch 17. The flexible beam 142 includes a pair of securing portions and the securing portions are formed at a free end of the flexible beam 142. The securing portions form a cavity and a pair of first holes 1420 located beside the cavity. The latch 17 includes a first distal end received in the cavity for securing with the flexible beam 142 and a second distal end engaging with the pressing blocks 162. The first distal end of the latch 17 includes a second hole 171 corresponding to the first holes 1420, and the pin member 18 passes through both the first holes 1420 and the second hole 171 for pivotally mounting the latch 17 on the flexible beam 142. When the plug connector 100 is mated with the socket connector 200, the butting assembly 14 is inserted into a receiving channel 210 of the socket connector 200, during which the butting assembly 14 provides an insertion force to the socket connector 200 and the flexible beam 142 endures reaction force from the socket connector 200. Because of the reaction force of the socket connector 200, the latch 17 rotates around the pin member 18, and the pressing blocks 162 press against the latch 17 for restricting the latch 17 to slide on the outer shell 16 in the front-and-back direction. The blocks 162 are spaced from each other in the left-and-right direction and an interspace 1620 is formed between the blocks 162. The latch 17 comprises a neck portion 170 which has a width smaller than the interspace 1620 for facilitating assembling the latch 17 in the upper-and-lower direction. After assembling the latch 17, the neck portion 170 is moved to be behind the blocks 162 along the front-and-back direction.

Figure 12:
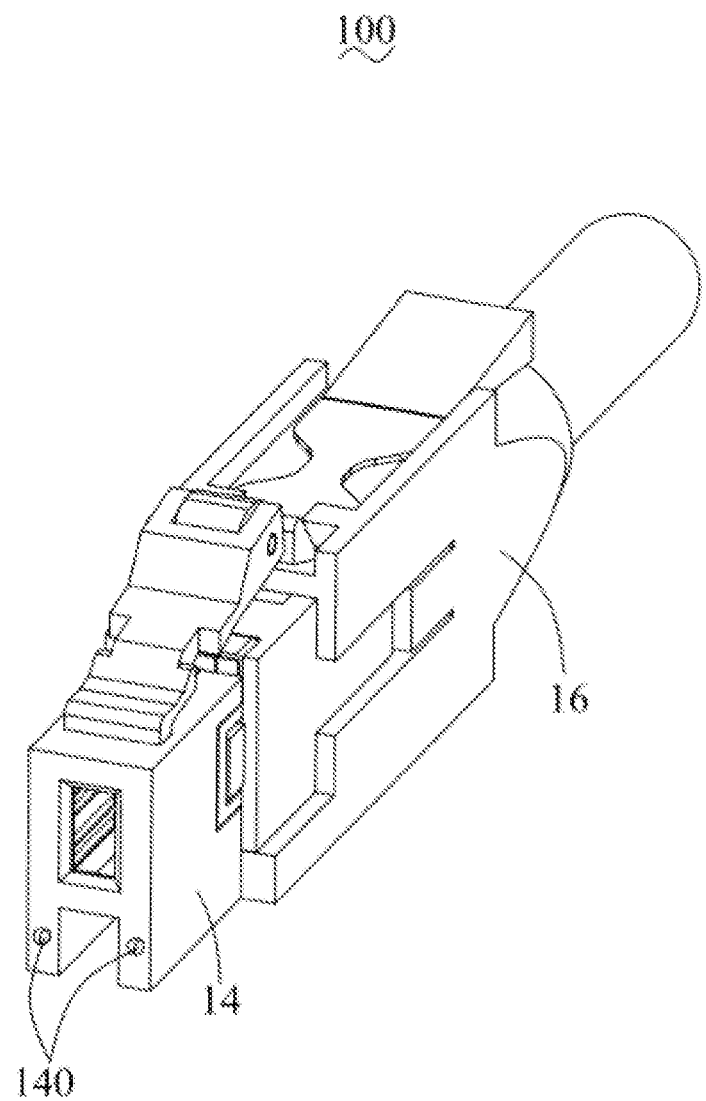
FIG. 12 is a perspective, assembled view of the plug connector in accordance with a third embodiment of the present disclosure.
Figure 13:
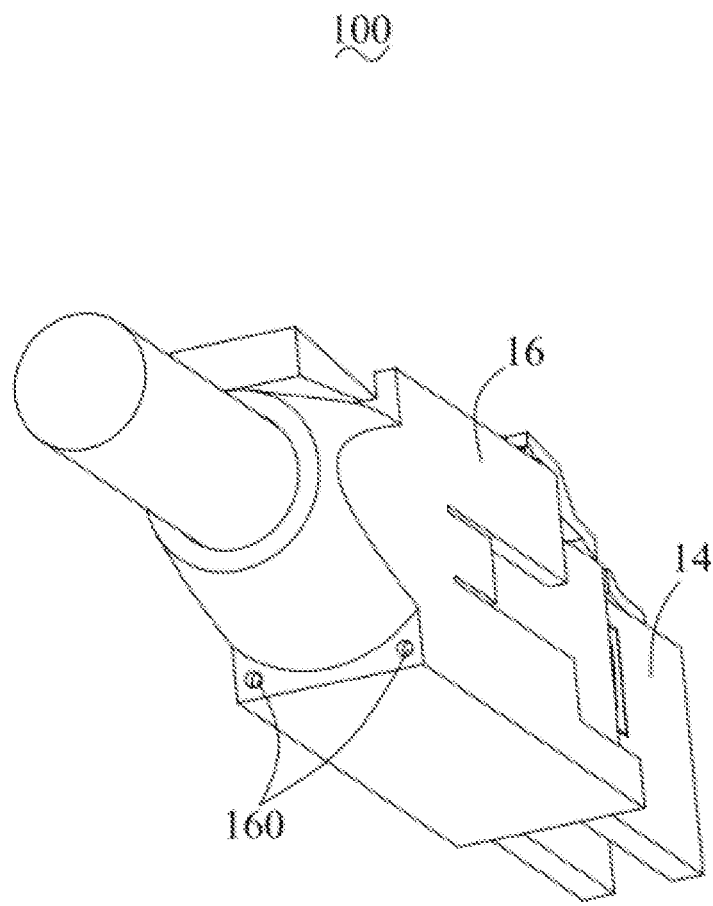
FIG. 13 is similar to FIG. 12 but taken a view from another angle.

Referring to FIGS. 12 and 13, the butting assembly 14 includes a first opening 140. The first opening 140 is formed at a front end of the butting assembly 14, which is near to the socket connector 200 and facing towards the socket connector 200. The outer shell 16 includes a second opening 160. The second opening 160 is formed at a rear end of the outer shell 16, which is far away from the socket connector 200. A light guiding element (not labeled) extends from the first opening 140 to the second opening 160 for connecting the first opening 140 with the second opening 160. The socket connector 200 includes an LED lamp (not shown). When the plug connector 100 and the socket connector 200 are mated with each other, the light emitted by the LED lamp enters from the first opening 140 and passes through the light guiding element to the second opening 160, which provides indication of the plug-in status or transmission status to the user.

Figure 14:
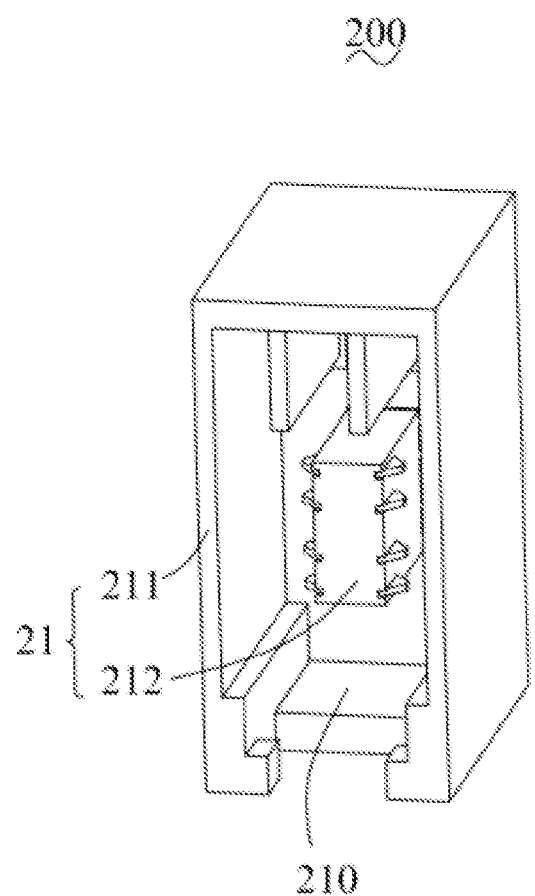
FIG. 14 is a perspective, assembled view of a socket connector mated with the plug connector of the present disclosure.
Figure 15:
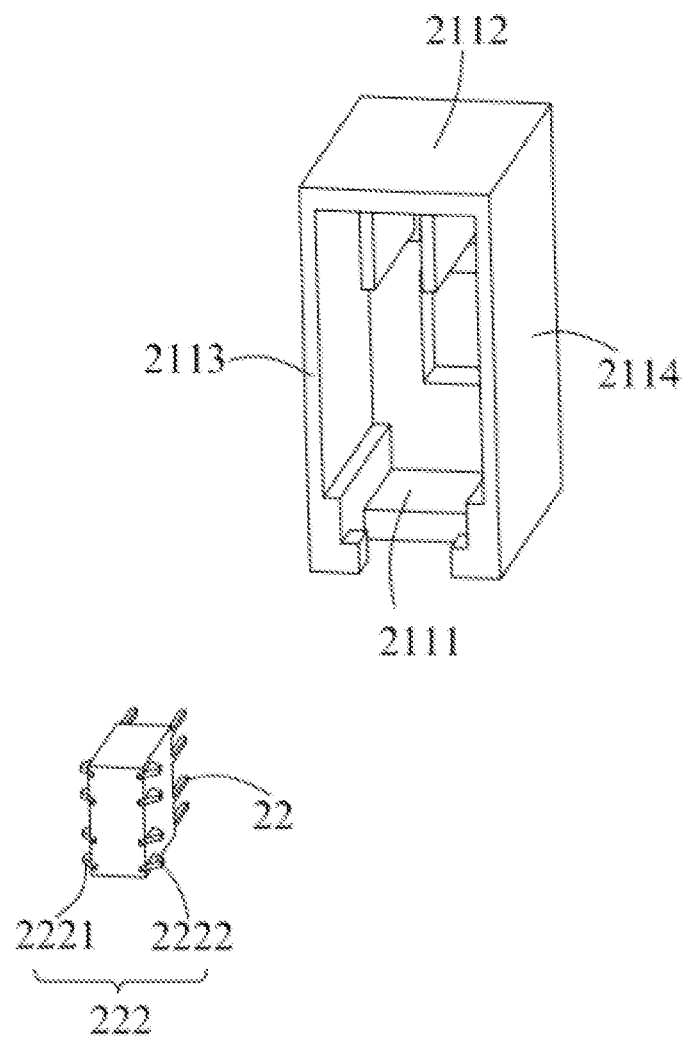
FIG. 15 is a perspective, exploded view of the socket connector of FIG. 14.
Figure 16:
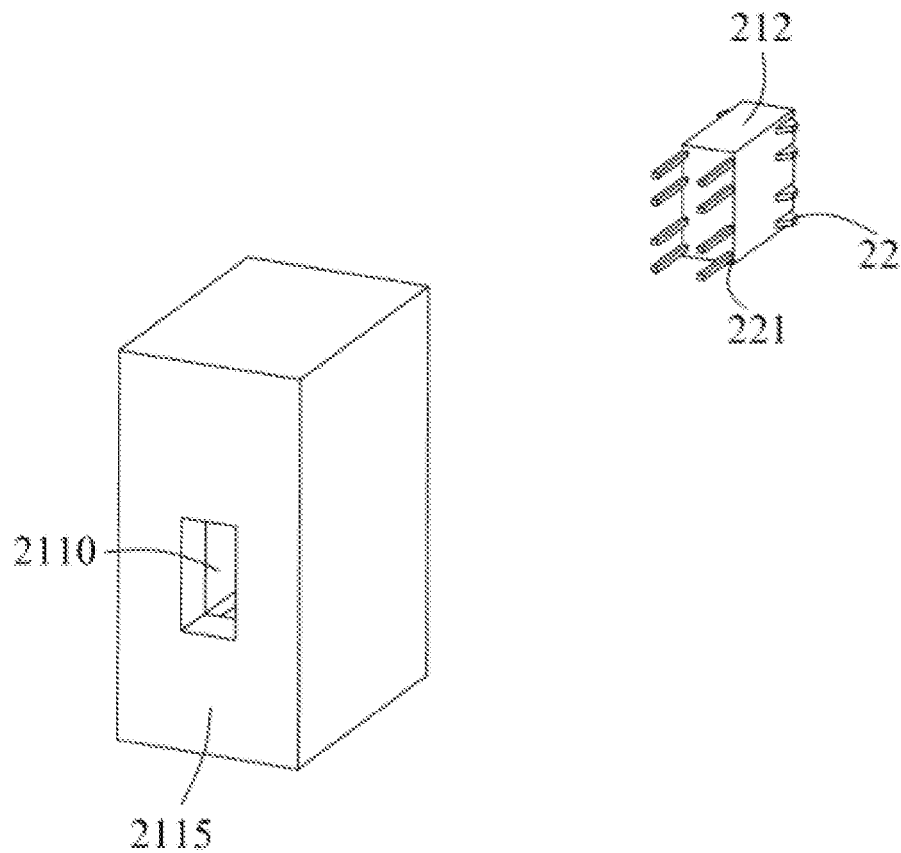
FIG. 16 is similar to FIG. 15 but taken a view from another angle.

Please referring to FIGS. 14 to 16, the socket connector 200 of the present disclosure includes an insulating base 21 and a plurality of socket terminals 22 retained in the insulating base 21. The insulating base 21 includes an outer plastic frame 211 defining the receiving channel 210 and an inner plastic block 212 received in the receiving channel 210. The socket terminals 22 are symmetrically arranged on the two sidewalls of the inner plastic block 212 in the left-and-right direction.

The socket terminals 22 are inserted into the inner plastic block 212 to form a terminal module. The outer plastic frame 211 includes a bottom wall 2111, a top wall 2112, a left wall 2113, a right wall 2114, and a rear wall 2115. The bottom wall 2111 and the top wall 2112 are positioned respectively in first and second horizontal planes which extend both along the front-and-back direction and the left-and-right direction. The left wall 2113 and the right wall 2114 are positioned respectively in first and second vertical planes which extend along both the up-and-down direction and the front-and-back direction for connecting the bottom wall 2111 with the top wall 2112. The rear wall 2115 is positioned in a third vertical plane which extend along both the up-and-down direction and the left-and-right direction for connecting to the bottom wall 2111, the top wall 2112, the left wall 2113, and the right wall 2114. The rear wall 2115 includes a cutout 2110. The terminal module is assembled into the cutout 2110.

Each socket terminal 22 includes a retaining portion 221 embedded in the inner plastic block 212 and a contacting portion 222 integrally extending from the retaining portion 221 and outside of the inner plastic block 212. The contacting portions 222 of the socket terminals 22 include a plurality of first contacting portions 2221 and a plurality of second contacting portions 2222. The first contacting portions 2221 protrude from the left sidewall of the inner plastic block 212 and face towards the left wall 2113 of the outer plastic frame 211. The second contacting portions 2222 protrude from the right sidewall of the inner plastic block 212 and face towards the right wall 2114 of the outer plastic frame 211. The first contacting portions 2221 and the second contacting portion 2222 are symmetrically arranged on the left and right sidewalls of the inner plastic block 212 in two vertical rows. In order to match with the plug terminals 12, the socket terminals 22 on each sidewall of the inner plastic block 212 also include at least one pair of differential signal terminals, and in the preferred embodiment, there are two pairs of differential signal terminals on each sidewall of the inner plastic block 212.

The present disclosure is changed from the straight-linear horizontal arrangement of the plug terminals of the traditional plug connector into a two-vertical symmetrical arrangement, which reduces the interface space of the plug connector and reduces the width of the plug connector from the existing 11.7 mm to 5.8 mm. That is said, the width of the plug connector 100 of the present disclosure is almost half the width of the traditional plug connector. Accordingly, the socket connector 200 mated with the plug connector 100 of the present disclosure is almost half of the width of the traditional socket connector, too. Therefore, the plug connector 100 and the socket connector of the present disclosure can save space and accordingly meet the demand for high-density applications in the market.

The above embodiments are only used to illustrate the present disclosure and not to limit the technical solutions described in the present disclosure. The understanding of this specification should be based on those skilled in the art. Descriptions of directions, such as "front", "back", "left", "right", "upper" and "lower", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A plug connector, comprising:
    an insulating housing which has a width direction extending along a left-and-right direction, wherein the insulating housing comprises a first insulating body, a second insulating body and a third insulating body, the first insulating body comprises two opposite vertically-extending surfaces, each vertically-extending surface includes a plurality of passages, the second insulating body and the third insulating body are arranged face to face along the left-and-right direction for defining a receiving space therebetween, the first insulating body comprises a plurality of protrusions;
    a plurality of plug terminals retained by the insulating housing and arranged in two rows in the width direction of the insulative housing, the plug terminals of each row being arranged in an upper-and-lower direction and spaced away from each other in the upper-and-lower direction, each plug terminal extending along a front-and-back direction, wherein each plug terminal comprises a retaining arm fixed in the passage and a contacting arm extending forward from the retaining arm into the receiving space;
    a cable comprising a plurality of core wires correspondingly and electrically connected with the plug terminals; and
    a securing assembly which encloses the first insulating body, the plug terminals and the core wires, wherein the securing assembly comprises a left plate and a right plate respectively and oppositely located beside the first insulating body, the second insulating body and the third insulating body are exposed outside of the securing assembly, each of the left plate and the right plate comprises a plurality of receiving holes correspondingly engaging with the protrusions, each of the left plate and the right plate comprises a plastic piece and a metal piece, the metal piece comprises a base portion and a plurality of first fastening portions, the base portion is embedded in the plastic piece, the first fastening portions laterally and outwardly bend from the upper and lower ends of the base portion, the receiving holes are formed on the first fastening portions.

2. The plug connector according to claim 1, wherein the second insulating body and the left plate are located at the same left side of the first insulating body, the second insulating body is positioned at the front of the left plate, the third insulating body and the right plate are located at the same right side of the first insulating body, the third insulating body is positioned at the front of the right plate.

3. The plug connector according to claim 1, wherein the protrusions are non-circular protrusions and the receiving holes are non-circular holes, each of the left plate and the right plate comprises a first front end and a second back end, due to cooperation between the non-circular protrusions and the non-circular holes, the first front ends and the second back ends are capable of being installed on the first insulating body synchronously.

4. The plug connector according to claim 1, wherein the protrusions are cylinders and the receiving holes are round holes, each of the left plate and the right plate comprises a first front end and a second back end, due to cooperation between the cylinders and the round holes, the first front ends are firstly installed on a front part of the first insulating body, the second back ends are capable of being rotated and then installed on a back part of the first insulating body subsequently.

5. The plug connector according to claim 1, wherein the plastic piece comprises an inner side facing to the first insulating body, the inner side forms a plurality of grooves extending along the front-and-back direction, the core wires are accommodated in the grooves.

6. The plug connector according to claim 5, wherein each groove comprises a shrink end, each plug terminal comprises a tail portion laterally bending from a rear end of the retaining arm, the first insulating body comprises a plurality of lumps which are symmetrically positioned on the left and right surfaces of the first insulating body, a front part of each core wire is fixed with the shrink end, a middle part of each core wire is snapped with the tail portion, a rear part of each core wire is fixed by the adjacent two lumps.

7. A plug connector, comprising:
    an insulating housing which has a width direction extending along a left-and-right direction, wherein the insulating housing comprises a first insulating body, a second insulating body and a third insulating body, the first insulating body comprises two opposite vertically-extending surfaces, each vertically-extending surface includes a plurality of passages, the second insulating body and the third insulating body are arranged face to face along the left-and-right direction for defining a receiving space therebetween;

a plurality of plug terminals retained by the insulating housing and arranged in two rows in the width direction of the insulative housing, the plug terminals of each row being arranged in an upper-and-lower direction and spaced away from each other in the upper-and-lower direction, each plug terminal extending along a front-and-back direction, wherein each plug terminal comprises a retaining arm fixed in the passage and a contacting arm extending forward from the retaining arm into the receiving space;

a cable comprising a plurality of core wires correspondingly and electrically connected with the plug terminals;

a securing assembly which encloses the first insulating body, the plug terminals and the core wires; and a butting assembly, an outer shell and a latch; wherein the butting assembly wraps the second insulating body and the third insulating body, the outer shell wraps the securing assembly, the latch pivotally connects to the butting assembly and is movable on the outer shell.

8. The plug connector according to claim 7, further comprising a pin member; wherein the butting assembly comprises a flexible beam and a first securing portion at a free end of the flexible beam, the first securing portion comprises a first hole, the latch comprises a second securing portion, the second securing portion comprises a second hole, the pin member passes through the first hole and the second hole.

9. The plug connector according to claim 8, further comprising a pair of blocks; wherein the blocks are spaced away from a top surface of the outer shell in the upper-and-lower direction, the outer shell supports the latch and the blocks press against the latch.

10. The plug connector according to claim 9, wherein the blocks are spaced from each other in the left-and-right direction and an interspace is formed between the block, the latch comprises a neck portion which has a width smaller than the interspace for facilitating assembling the latch in the upper-and-lower direction.

11. A connector assembly, comprising:
a plug connector comprising:
an insulating housing with a width extending along a left-and-right direction, wherein the insulating housing comprises a first insulating body, a second insulating body and a third insulating body, the first insulating body comprises two opposite vertically-extending surfaces, each vertically-extending surface includes a plurality of passages, the second insulating body and the third insulating body are arranged face to face along the left-and-right direction for defining a receiving space therebetween, the first insulating body comprises a plurality of protrusions;

a plurality of plug terminals retained by the insulating housing and arranged in two rows in the left-and-right direction, the plug terminals of each row being separately arranged in an upper-and-lower direction, each plug terminal extending along a front-and-back direction, wherein each plug terminal comprises a retaining arm fixed in the passage and a contacting arm extending forward from the retaining arm into the receiving space;

a cable comprising a plurality of core wires correspondingly and electrically connected with the plug terminals; and a securing assembly which encloses the first insulating body, the plug terminals and the core wires, wherein the securing assembly comprises a left plate and a right plate respectively and oppositely located beside the first insulating body, the second insulating body and the third insulating body are exposed outside of the securing assembly, each of the left plate and the right plate comprises a plurality of receiving holes correspondingly engaging with the protrusions, each of the left plate and the right plate comprises a plastic piece and a metal piece, the metal piece comprises a base portion and a plurality of first fastening portions, the base portion is embedded in the plastic piece, the first fastening portions laterally and outwardly bend from the upper and lower ends of the base portion, the receiving holes are formed on the first fastening portions; and a socket connector comprising:
an inner plastic block;
an outer plastic frame surrounding the inner plastic block; and
a plurality of socket terminals retained by the inner plastic block and also arranged in two rows in the left-and-right direction, the plug terminals respectively and electrically connecting with the socket terminals, the socket terminals of each row being separately arranged in the upper-and-lower direction, each socket terminal extending along the front-and-back direction, too.

12. The connector assembly according to claim 11, wherein the outer plastic frame comprises a bottom wall, a top wall, a left wall, a right wall and a rear wall, the bottom wall, the top wall, the left wall, the right wall and the rear wall cooperatively define a receiving channel, the inner plastic block extends from the rear wall into the receiving channel, the inner plastic block comprises a left sidewall opposite to the left wall and a right sidewall opposite to the right wall.

13. The connector assembly according to claim 12, wherein the socket terminals comprise a plurality of first contacting portions and a plurality of second contacting portions, the first contacting portions protrude from the left sidewall and face towards the left wall, the second contacting portions protrude from the right sidewall and face towards the right wall.

14. A connector assembly, comprising:
a plug connector, comprising:
an insulating housing which has a width direction extending along a left-and-right direction, wherein the insulating housing comprises a first insulating body, a second insulating body and a third insulating body, the first insulating body comprises two opposite vertically-extending surfaces, each vertically-extending surface includes a plurality of passages, the second insulating body and the third insulating body are arranged face to face along the left-and-right direction for defining a receiving space therebetween;

a plurality of plug terminals retained by the insulating housing and arranged in two rows in the width direction of the insulative housing, the plug terminals of each row being arranged in an upper-and-lower direction and spaced away from each other in the upper-and-lower direction, each plug terminal extending along a front-and-back direction, wherein each plug terminal comprises a retaining arm fixed in the passage and a contacting arm extending forward from the retaining arm into the receiving space;

a cable comprising a plurality of core wires correspondingly and electrically connected with the plug terminals;

a securing assembly which encloses the first insulating body, the plug terminals and the core wires; and a butting assembly, an outer shell and a latch; wherein the butting assembly wraps the second insulating body and the third insulating body, the outer shell wraps the securing assembly, the latch pivotally connects to the butting assembly and is movable on the outer shell; and a socket connector comprising:
an inner plastic block;
an outer plastic frame surrounding the inner plastic block; and
a plurality of socket terminals retained by the inner plastic block and also arranged in two rows in the left-and-right direction, the plug terminals respectively and electrically connecting with the socket terminals, the socket terminals of each row being separately arranged in the upper-and-lower direction, each socket terminal extending along the front-and-back direction, too.

15. The connector assembly according to claim 14, wherein the outer plastic frame comprises a bottom wall, a top wall, a left wall, a right wall and a rear wall, the bottom wall, the top wall, the left wall, the right wall and the rear wall cooperatively define a receiving channel, the inner plastic block extends from the rear wall into the receiving channel, the inner plastic block comprises a left sidewall opposite to the left wall and a right sidewall opposite to the right wall.

16. The connector assembly according to claim 15, wherein the socket terminals comprise a plurality of first contacting portions and a plurality of second contacting portions, the first contacting portions protrude from the left sidewall and face towards the left wall, the second contacting portions protrude from the right sidewall and face towards the right wall.

\* \* \* \* \*